(No Model.) 5 Sheets—Sheet 3.
F. H. VAN HOUTEN.
BLIND SLAT PLANING MACHINE.

No. 408,863. Patented Aug. 13, 1889.

(No Model.)  5 Sheets—Sheet 4.
F. H. VAN HOUTEN.
BLIND SLAT PLANING MACHINE.
No. 408,863.  Patented Aug. 13, 1889.
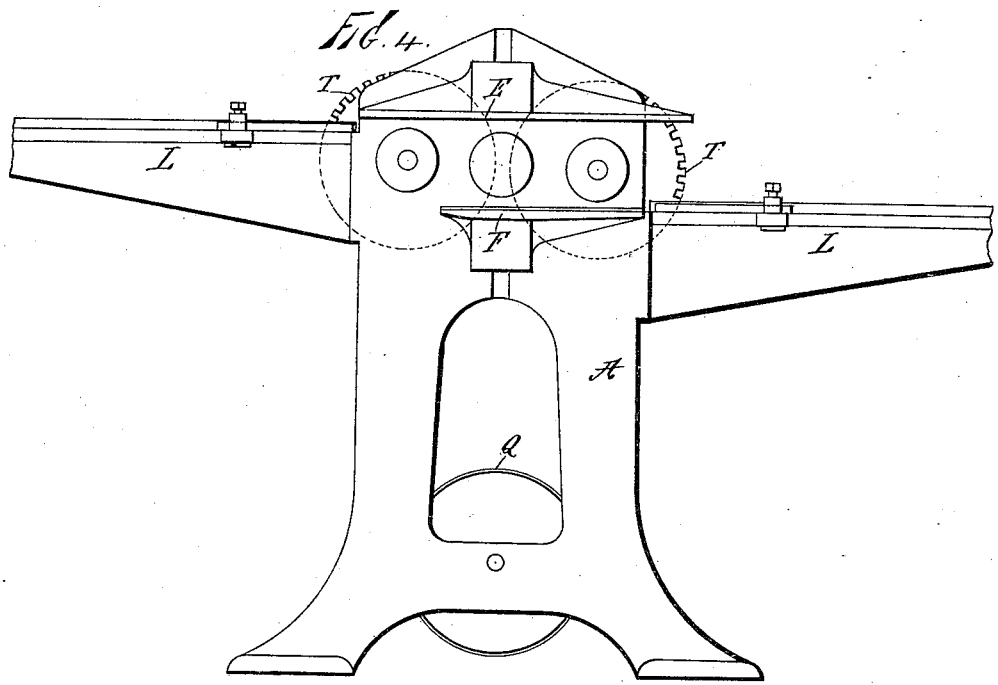
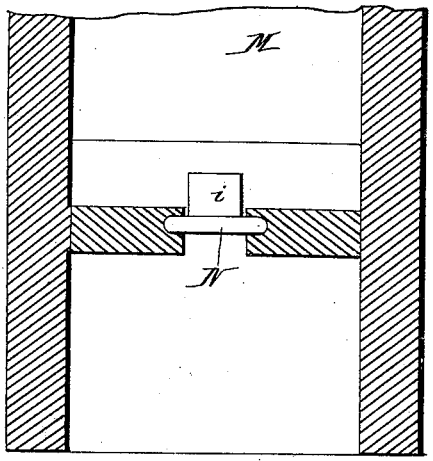
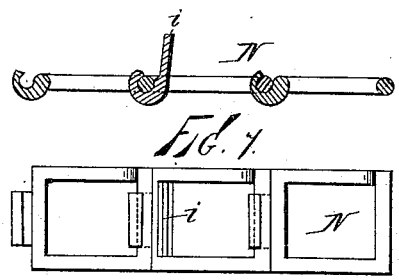
Witnesses:
John Buckles,
L. H. Osgood
Inventor:
Frank H. Van Houten,
By Worth Osgood
Attorney.

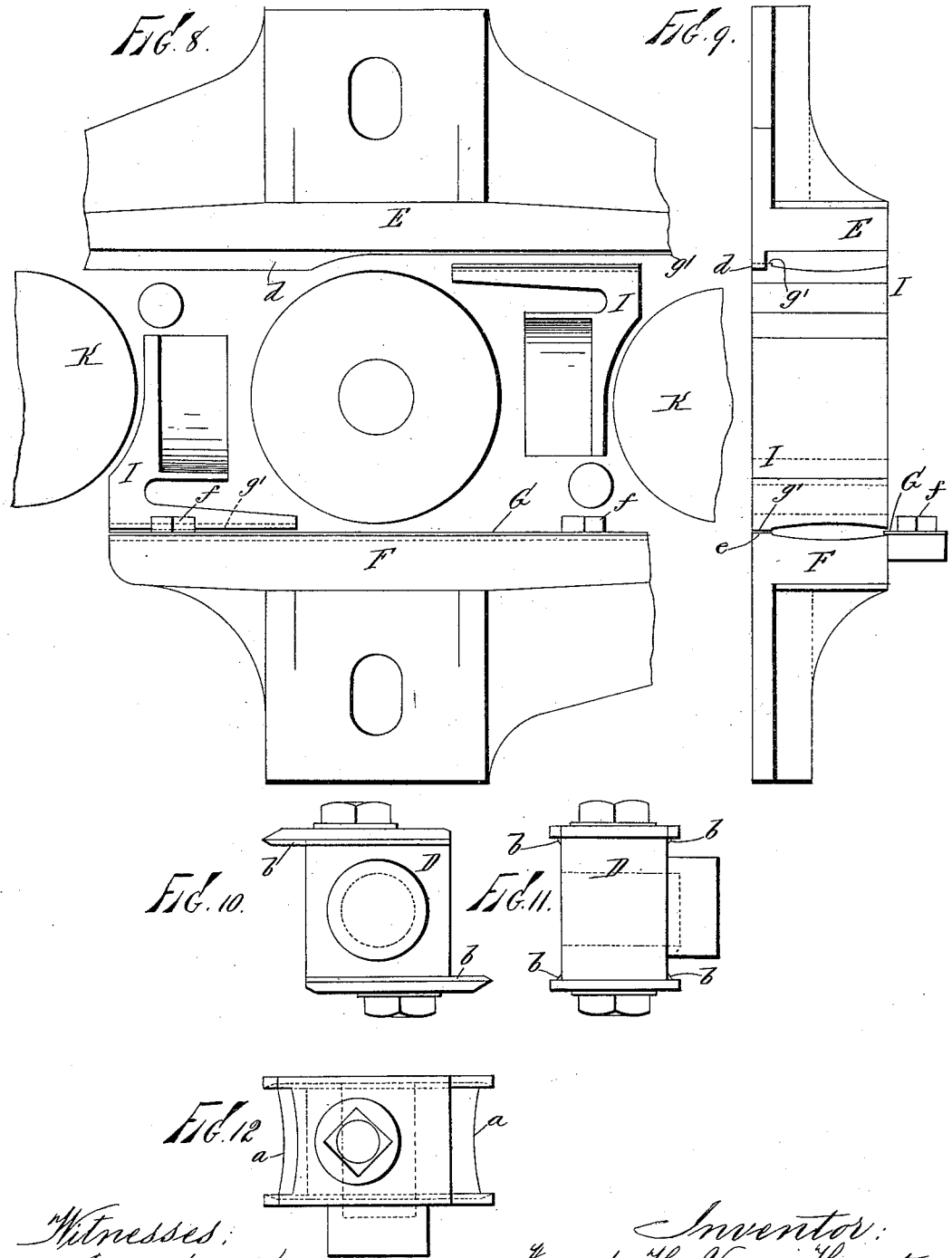

UNITED STATES PATENT OFFICE.

FRANK H. VAN HOUTEN, OF MATTEAWAN, NEW YORK.

BLIND-SLAT-PLANING MACHINE.

SPECIFICATION forming part of Letters Patent No. 408,863, dated August 13, 1889.

Application filed October 23, 1888. Serial No. 288,930. (No model.)

*To all whom it may concern:*

Be it known that I, FRANK H. VAN HOUTEN, of Matteawan, county of Dutchess, and State of New York, have invented certain new and useful Improvements in Blind-Slat-Planing Machines, of which the following is a full, clear, and exact description, reference being had to the accompanying drawings, and to the letters of reference marked thereon.

My invention relates to machines for planing blind-slats and similar articles from previously-prepared blanks of wood, and has for its object the provision or production of a machine of few and simple parts, easy to operate and to care for, which will do the required work accurately and rapidly with economy of wear and motive power, which may be easily and cheaply made, and which may be operated with or without an automatic feed. To accomplish all of this and to secure other and further advantages in the matters of construction and operation, my improvements involve certain new and useful arrangements or combinations of parts and peculiarities of construction, as will be herein first fully described, and then pointed out in the claims.

Heretofore slats have been planed upon molding-machines and upon some special forms of slat-planing machines which, so far as I am aware, have no less than four heads carrying eight knives to accomplish the planing of the four surfaces of the slats. I employ a single cutter-head, and thus dispense with many parts, reducing the cost of construction and operating expenses.

Figure 1:
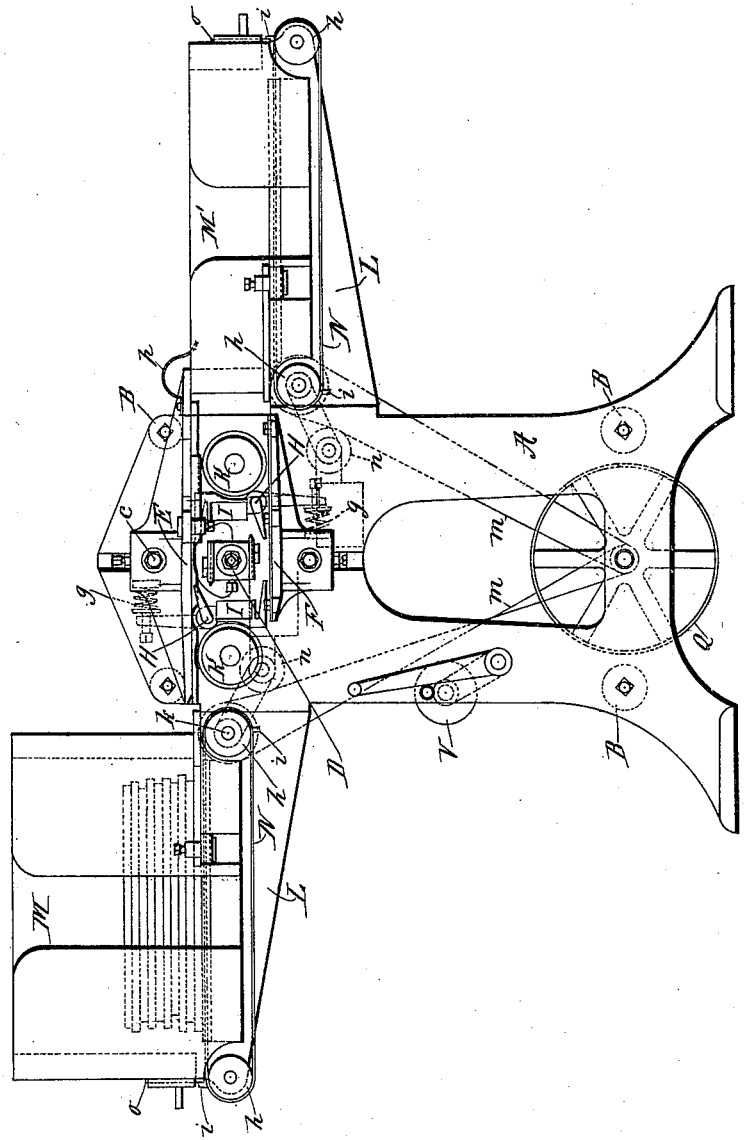
Figure 2:
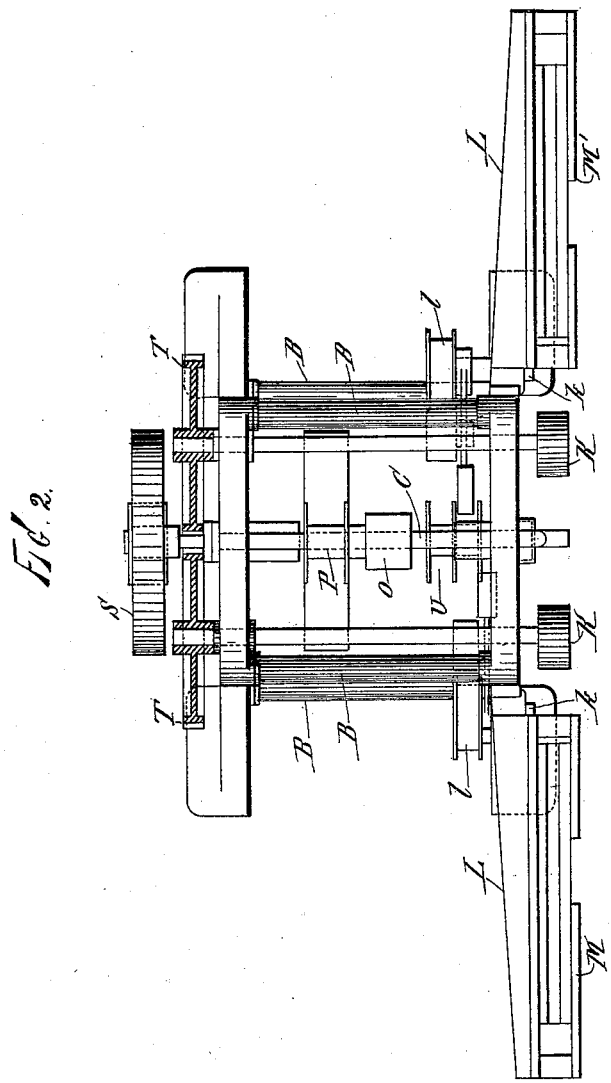

In the accompanying drawings, forming part of this specification, Figure 1 is a side elevation of my improved machine, showing the automatic feeding appliance in place (which may be omitted) and the parts in position for operation. Fig. 2 is a top or plan view, and Fig. 3 an end view, indicating the arrangement of the shafts and pulleys. Fig. 4 is a side elevation of the frame and various parts, with the hoppers of Figs. 1 and 2 omitted, showing the machine adapted for hand-feeding. Fig. 5 is a cross-section through one of the hoppers, showing the guides or ways for the feeding chain belts which may be employed, the chain being in elevation. Fig. 6 is a longitudinal section and elevation, and Fig. 7 a plan view, of a fragment of one of the chain belts. Fig. 8 is a side view (enlarged beyond previous figures) of a fragment of the machine, showing the beds and slat-guides and the position of the cutter-head; and Fig. 9 is an end view corresponding with Fig. 8, showing the shape given the top and bottom beds and the pressure-bars employed therewith. Fig. 10 is a front elevation, Fig. 11 a side elevation, and Fig. 12 a top or plan view of one form of cutter-head which may be used, (not specially claimed herein,) the same being viewed from the position which it occupies in the machine, but detached from the cutter-shaft.

In all these figures like letters of reference, wherever they occur, indicate corresponding parts.

A A are the main or side pieces of the frame, made of ample strength and securely braced and tied, as by cross-pieces B B, at suitable intervals.

C is the cutter-shaft, journaled in the frame and carrying a single cutter-head D, which is provided with two knives $a$ $a$. As it is desirable that one head with two knives shall dress the slat on four surfaces, (two sides and two edges,) the knives must be of peculiar construction to accomplish this end.

The finishing of the sides of the slats would be an easy matter, the ordinary knives being sufficient for that purpose; but to dress the edges with the same knives at the same time demands a peculiarly-constructed knife adapted to this particular work.

As indicated, the body of the head is square, or approximately so. The knives have upon each edge a lip $b$, which projects inward and fits over the ends of the square part of the head. The distance between the lips is the same as the width of the slat when finished. These lips are for the purpose of finishing the edges of the slats and at the same time to furnish a guide which will sustain the two knives always in the same relation with respect to the head and with each other. As the cutting-edge is filed or sharpened to a gage, it is only necessary to use care in making each knife swing in the same circle.

Over and under the cutter are placed adjustable beds, in contact with which the slats pass while being dressed.

E is the top bed, mounted upon the frame in such manner as to be adjustable up and down within reasonable limits. It is constructed with two flanges which straddle a projecting surface on the frame, and is secured to the frame by a bolt, as c, which passes through a slot in the bed and is threaded into the projecting piece on the frame, affording means for readily adjusting the bed toward or from the cutter. The surface of this bed in contact with which the side of the slat passes is flat, and it is provided on the inner edge with a flange d, which serves to guide the slat in a straight line before it reaches the knives.

F is the bottom bed, mounted upon and secured to the frame in the same manner as the top bed. The surface of this bed over which the side of the slat passes is of the same shape in cross-section as the side of the slat when finished, for it is that side of the slat which has passed over the cutter and been finished which comes in contact with this bed. On the inner edge of this lower bed, and extending its whole length, is a raised rib or guide e, which reaches up to about the center of the slat, and on the outer edge is an adjustable guide G, of like height, which is secured by means of screws $f\ f$, passing through slots in the guide and entering the bed. That portion of the edge of the slat which is finished in passing over of the cutter bears against this guide G, which maintains the slat in a straight path while it is passing under the cutter to be finished. The slat having been partly finished by passing over the cutter, is placed in the lower bed and the guide G set against it in such manner as to press it lightly against the guide e. All the slats must then travel accurately between the two guides, and will therefore be finished accurately.

At H H are two yielding pressure-bars journaled in the frame and located on either side of the cutter-head preceding the cut. These hold the slats while being planed firmly on the beds, and they are provided with springs, as $g\ g$, in any of the usual ways, and for the usual purposes of guiding and holding material before reaching the cutters.

In connection with the top and bottom beds and having the same shape upon that surface which comes in contact with the slat as does the bottom bed—that is, the same shape as the side of the finished slat—are two adjustable pressure bars or blocks I I. These bars have also projecting guide-ribs $g'\ g'$ on their inner edges, corresponding with and of the same height as the guide e on the inner edge of the bottom bed, and the bars are secured upon the frame in the position shown in the drawings, and with their axes in the same vertical plane as the axis of the bottom bed.

It will be observed from an inspection of Fig. 9 that the pressure-bars, in connection with the top and bottom beds, form each an orifice the shape of the slat as it leaves the cutter. This arrangement serves to maintain the slat in the same relative position with respect to the knives during the entire operation of planing or finishing. The construction of these pressure-bars and bottom bed is of importance in the finishing of the slat, for, as the under side of the slat is first passed over the head and shaped, (together with half of each edge,) it is plain that the slat must occupy precisely the same relation to the head while being finished on the opposite side. Otherwise, as the knives only cut to the center of the slat in thickness, if the same line were not maintained the edges could not be finished accurately, and each edge would carry an overlapping portion. The arrangement indicated compels the slats to travel in the required manner.

Two feed-rolls, as K K, are driven by proper arrangement of belts and gears. These serve to force or feed the slats in the proper direction, and they may be milled on their bearing-surfaces, and may be made yielding by means of springs in the usual way, so that there shall always be a pressure on the slat to insure its being fed to the cutter.

Suitable feed-tables, as L L, are connected to the frame and located at proper heights. Blanks for the slats having been first sawed out or prepared, they may of course be fed by hand one at a time first over the cutter, then underneath it, as will be readily understood, and it is intended that the machine shall be employed in this way, if desired. To facilitate the feeding, however, and to thus increase the capacity of the machine, I employ two hoppers, one at either end of the machine, which I designate as the "entering" and "delivering" hopper. These are shown, respectively, at M and M'. They are about alike in construction and serve like purposes—viz., to deliver slats to the feed-rolls. At each end of each hopper is located a suitable pulley or sprocket-wheel, as h. These wheels carry chain belts, as N, composed of links having straight sides, which pass through guiding grooves or channels formed in the tables or bottoms of the hoppers, as best indicated in Fig. 5.

Upon each chain belt are fixed two spurs $i\ i$, equidistant from each other, and these project far enough above the guide-slots through which the chain belts pass to catch the end of one slat as it lies on the bottom of the hopper.

The sprocket-wheels nearest the center of the machine are mounted upon shafts, as $k\ k$, which pass through bearings in the frame and have fixed on their opposite ends pulleys, as $l\ l$, over which pass slip-belts, as $m\ m$. These are kept at an even tension by means of tightener-pulleys, as $n\ n$, which are weighted and hang upon the belts.

To the outer end of each hopper are applied sliding bolts, as $o\ o$, for the purpose of holding the chain belts stationary should it be desired to stop the feed from the hoppers. The bolts may be supplied with rubber cushions to relieve the shock when a spur $i$ comes in contact with the bolt with full force. The slip-belts $m$ will travel even when the chain belts are arrested. The endless chain belts are normally driven at a greater rate of speed than are the feed-rolls.

It will be observed that as the speed of the belts carrying the spurs which force the slats out of the hoppers to the feed-rolls is greater than that of the rolls the speed of these belts must diminish and only equal that of the rolls while the slats are being fed, and to permit this the belts $m\ m$ then slip upon the driving-pulleys.

As the spurs upon the chain belts reach and pass around the pulleys or sprocket-wheels at the inner ends of the hoppers, the spur which was in contact with the slat leaves the slat, and immediately upon being released resumes its normal speed and continues its motion, catching the slat which has taken the place of the one last passed through and shooting it forward against the end of the preceding slat before the latter has passed under the feed-roll. This causes a continuous feed, each slat following close against the other.

To the end of the top bed nearest the delivery-hopper is attached a spring $p$, which comes in contact with the slats. As they reach the end of the bed, they are released and the spring forces them into the bottom of the hopper with the rough or unplaned side up, which is the proper position for the next operation. This spring is very important in connection with the working of the automatic feed. As the slats follow closely upon each other, their rough ends pressing one against the other, it is found that there is not weight enough in a slat to separate the ends when the hopper is nearly full, and therefore the spring is brought to bear upon each to force it free from the next following one and into the hopper in the proper manner.

Figure 3:
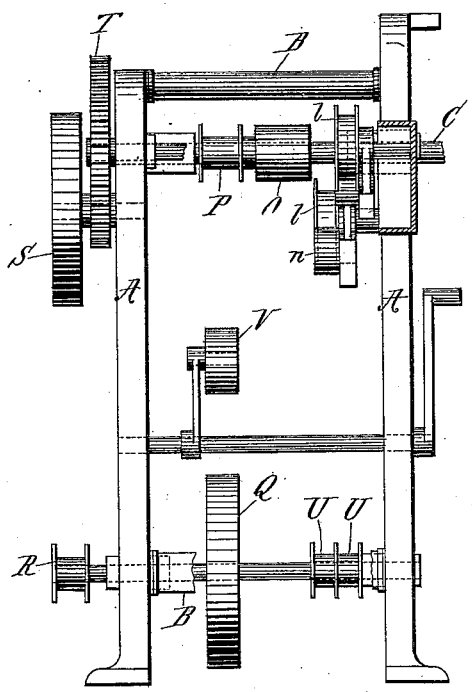

The arrangement of the driving pulleys and gears may of course be variously modified according to circumstances. That arrangement shown in Figs. 2 and 3 is compact, convenient, and is most approved. Of these parts, O is a driven pulley on the cutter-shaft, which may be driven from counter-shaft overhead; P, a flanged pulley on cutter-shaft, from which the feed-shaft at bottom of machine is driven through belt-connection with a feed-pulley Q. R is a flanged pulley on feed-shaft, from which a belt leads to pulley S, carrying a pinion which drives gears T T on the feed-roller shafts.

The pulleys which drive the slip-belts are represented at U U, and V represents a tightener-pulley, which may be swung upon the feed-belt when it is desired to start the feed.

To operate the machine with the automatic feed, first fill the entering hopper M with the previously-sawed blanks for the slats to be planed, press down the bolts $o\ o$ at the outward end of each hopper, so that the chain belts carrying the spurs $i\ i$ shall be held stationary, start the cutter D, and put on the tightener V, which starts the feed-rolls. Then withdraw the bolt $o$ of the entering hopper. The spur on the belt of this hopper being thus released shoots forward, propelled by the slip-belt, and carries the lowermost slat to the roll, which feeds it between the top bed E and the cutter, finishing the under side and part of each edge and dropping it into the delivering-hopper M' with the rough or unfinished side up. When the delivering-hopper M' is about three-fourths full, the bolt $o$ thereon is withdrawn and the lowermost slat therein is carried to the delivering feed-roll and is fed between the bottom bed F and the cutter, which finishes the remaining rough upper side and what remains of the two edges to be finished. It is then only necessary to keep the entering hopper supplied, as the feed is even or regular, and as fast as one slat is taken from the bottom of the delivering-hopper another is dropped in at the top.

Slats of any desired dimensions and shape in cross-section can be planed by having the knives and bed-plate F and pressure-bars I made the desired shape. If the slats be "grained"—that is, placed in the entering hopper with the general trend of the grain inclined back from the cutter-head—they will be delivered by the automatic feeding apparatus both above and below the cutter-head to best advantage for finishing both sides, and the necessity of turning the partly-finished slat end for end, as is required in other machines, is obviated by my improved device for accomplishing all the planing with a single head.

Being constructed and arranged for operation substantially in accordance with the foregoing explanations, the improved machine has been found in practice to admirably answer all the purposes or objects of the invention previously set forth.

Having now fully described my invention, what I claim as new herein, and desire to secure by Letters Patent, is—

1. In a machine for planing blind-slats, the combination, with the top bed or frame, of a spring applied thereon at the end nearest the delivery-hopper, its free end projecting to strike and separate the slats as they leave the cutter, substantially as explained.

2. In a machine for planing blind-slats, in combination with a cutter-head and its knives, the adjustable bottom bed-plate and the delivery pressure-bars conforming in cross-section to the shape of the slat, substantially as shown, and for the purposes set forth.

3. In a machine for planing blind-slats, the combination, with a cutter-head and its knives, of the top and bottom bed-plates, each provided with a raised rib or guide upon its inner edge, said rib being about equal in height to half the thickness of the slat to be planed, substantially as shown, and for the purpose explained.

4. In a machine for planing blind-slats, the combination, with the bottom bed-plate having the guide-rib upon its inner edge, of the adjustable guide applied upon the outer edge, substantially as shown, and for the purposes set forth.

5. In a machine for planing blind-slats, the combination, with the bottom bed-plate, of the pressure-bar applied in connection therewith, the upper surface of said bed-plate and the under surface of said pressure-bar conforming in shape to the slat to be planed, and the two provided with guides, substantially as shown and described.

6. In a machine for planing blind-slats, the combination, with the cutter, the feed-rolls, and pressure-bars, of the two hoppers having the feeding chain belts, all arranged to operate substantially as shown and described.

In testimony that I claim the foregoing I have hereunto set my hand in the presence of two witnesses.

FRANK H. VAN HOUTEN.

Witnesses:
SHERWOOD PHILLIPS,
SAMUEL ROGERS.